Figure 1:
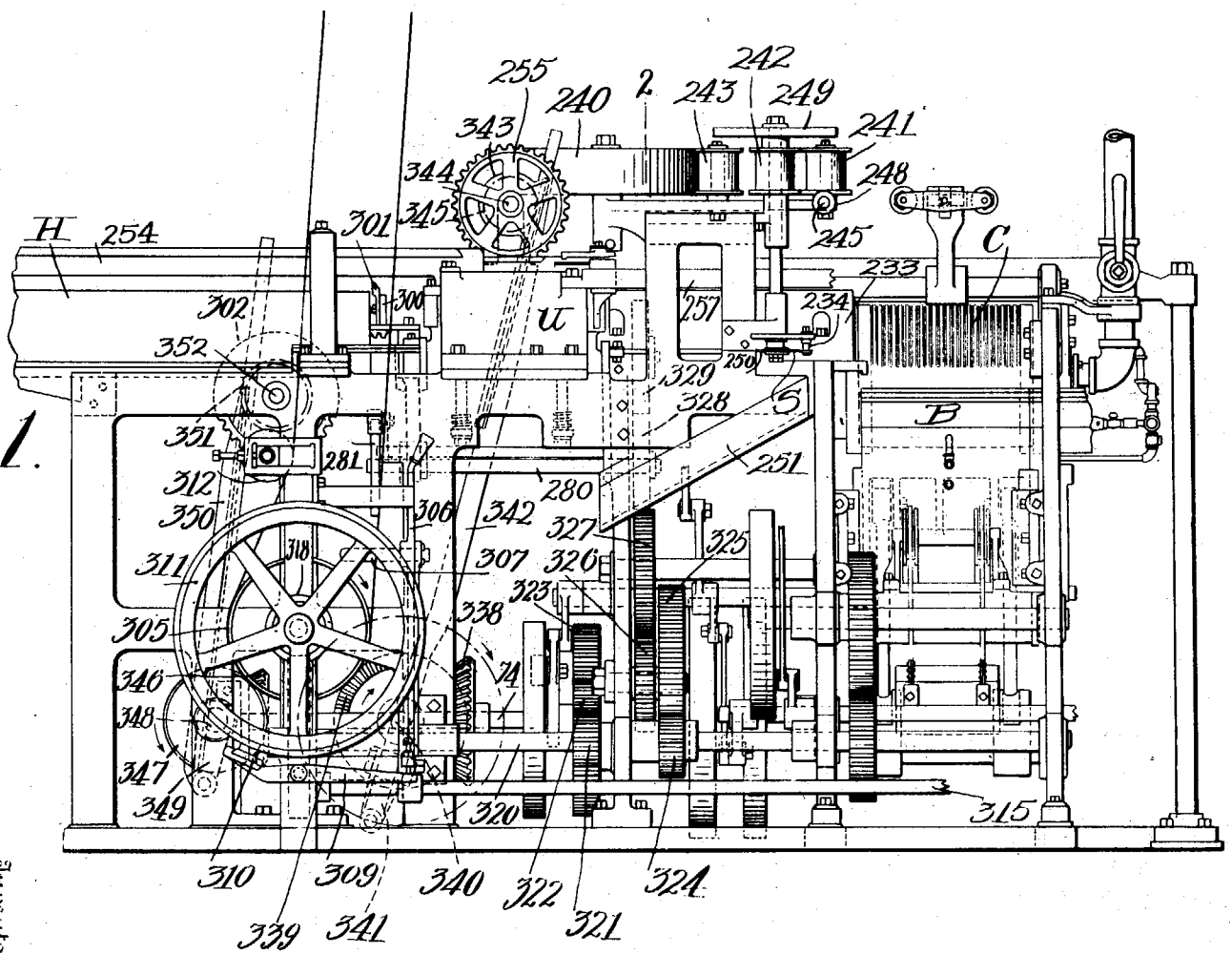

H. A. W. WOOD.

STEREOTYPE PRINTING PLATE FINISHING MECHANISM.

APPLICATION FILED AUG. 9, 1913

Reissued Oct. 21, 1913.

13,633.

8 SHEETS-SHEET 1.

Witnesses

C. F. Wesson

O. J. Hartnett

Inventor

H. A. Wise Wood

By Souttgate & Souttgate.

Attorneys

H. A. W. WOOD.
STEREOTYPE PRINTING PLATE FINISHING MECHANISM.
APPLICATION FILED AUG. 9, 1913.
Reissued Oct. 21, 1913. 13,633.
8 SHEETS—SHEET 2.
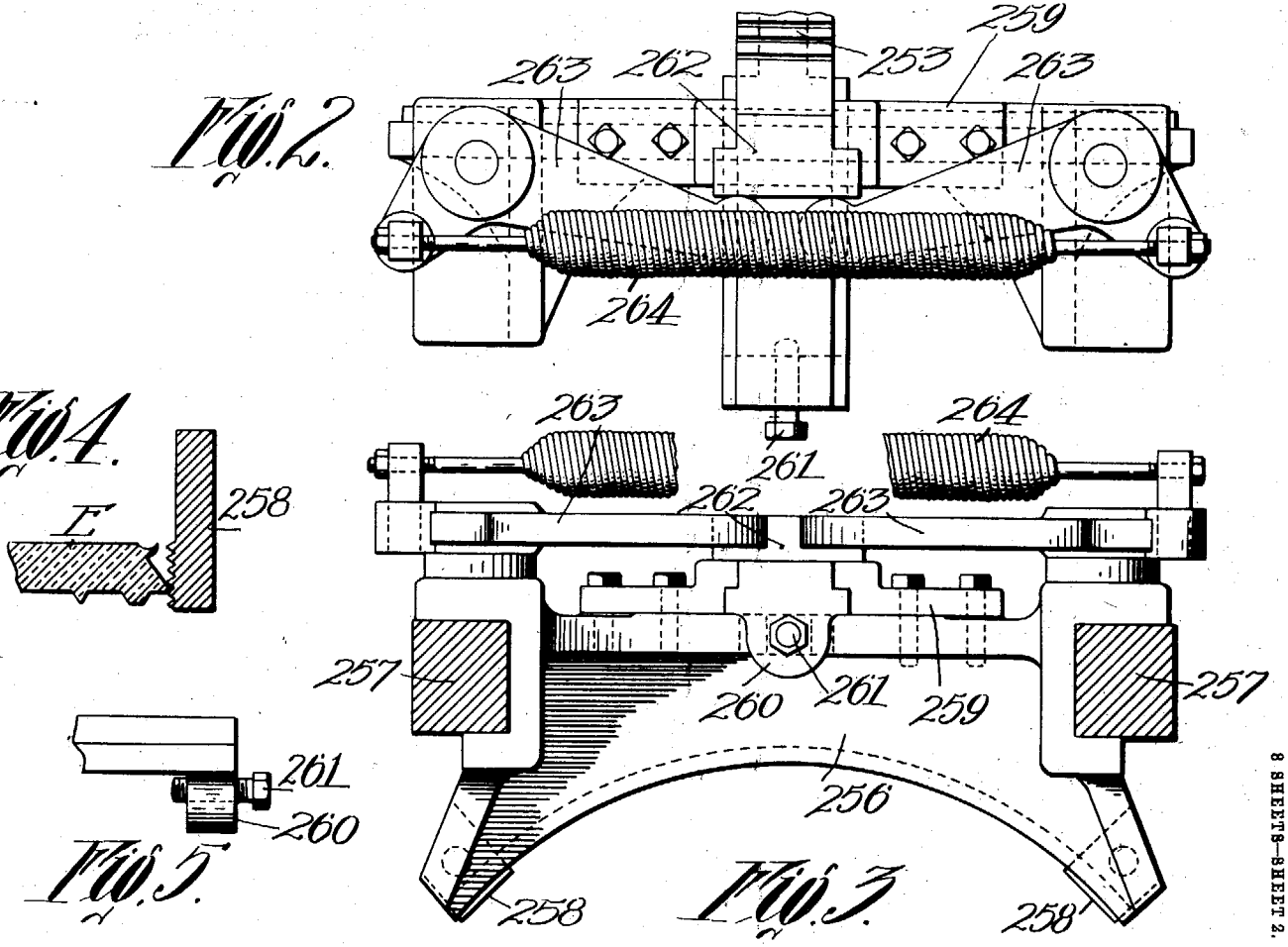
Witnesses
C. F. Mason
C. I. Hartnett
Inventor
H. A. Wise Wood.
By Southgate & Southgate.
Attorneys H. A. W. WOOD.
STEREOTYPE PRINTING PLATE FINISHING MECHANISM.
APPLICATION FILED AUG. 9, 1913.
Reissued Oct. 21, 1913.
13,633.
8 SHEETS—SHEET 3.
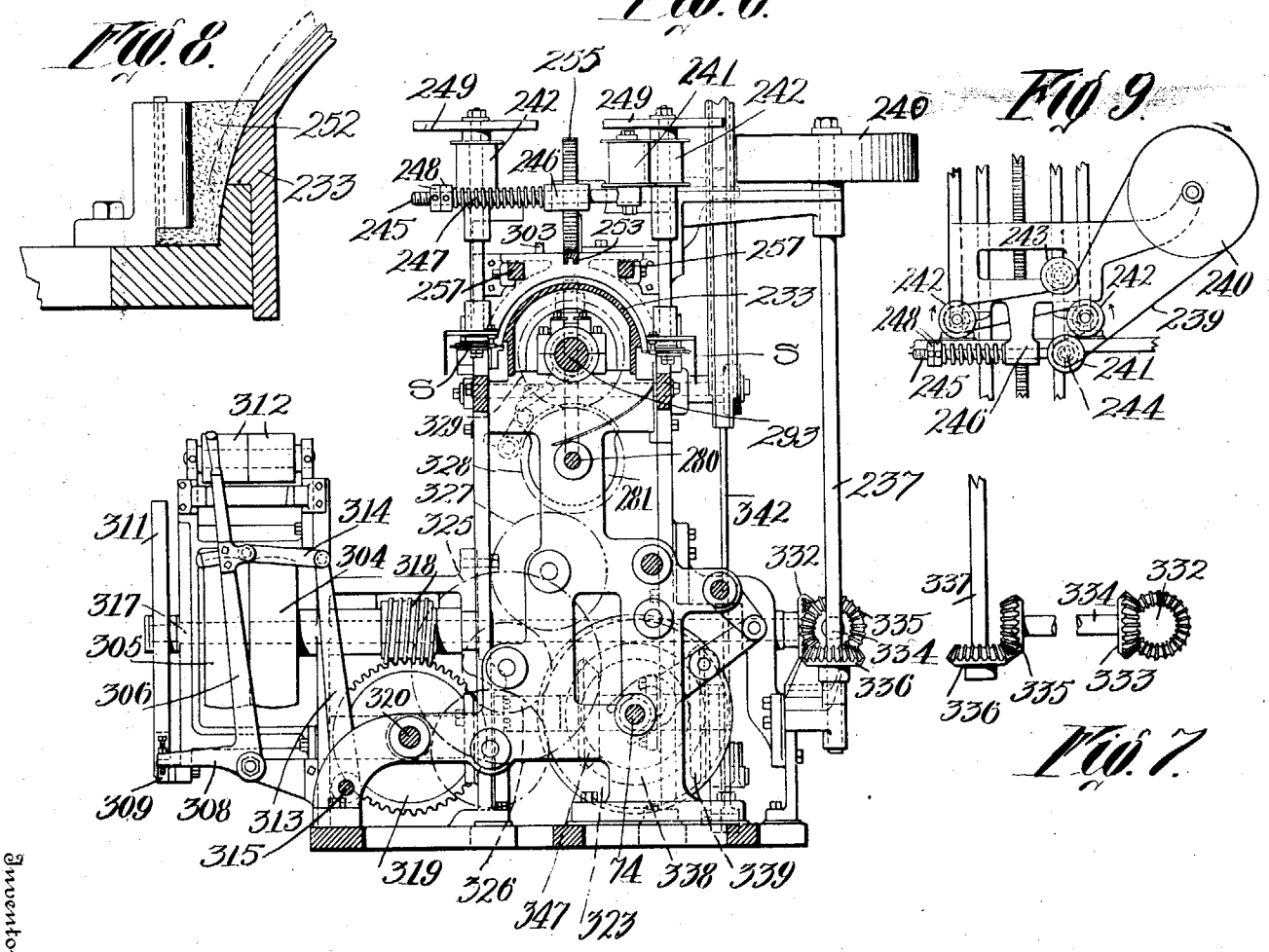
Inventor
H. A. Wise Wood
Witnesses
C. F. Nieson
C. S. Hartnett
By Southgate & Southgate
Attorneys H. A. W. WOOD.
STEREOTYPE PRINTING PLATE FINISHING MECHANISM.
APPLICATION FILED AUG. 9, 1913.
Reissued Oct. 21, 1913.
13,633.
8 SHEETS—SHEET 4.
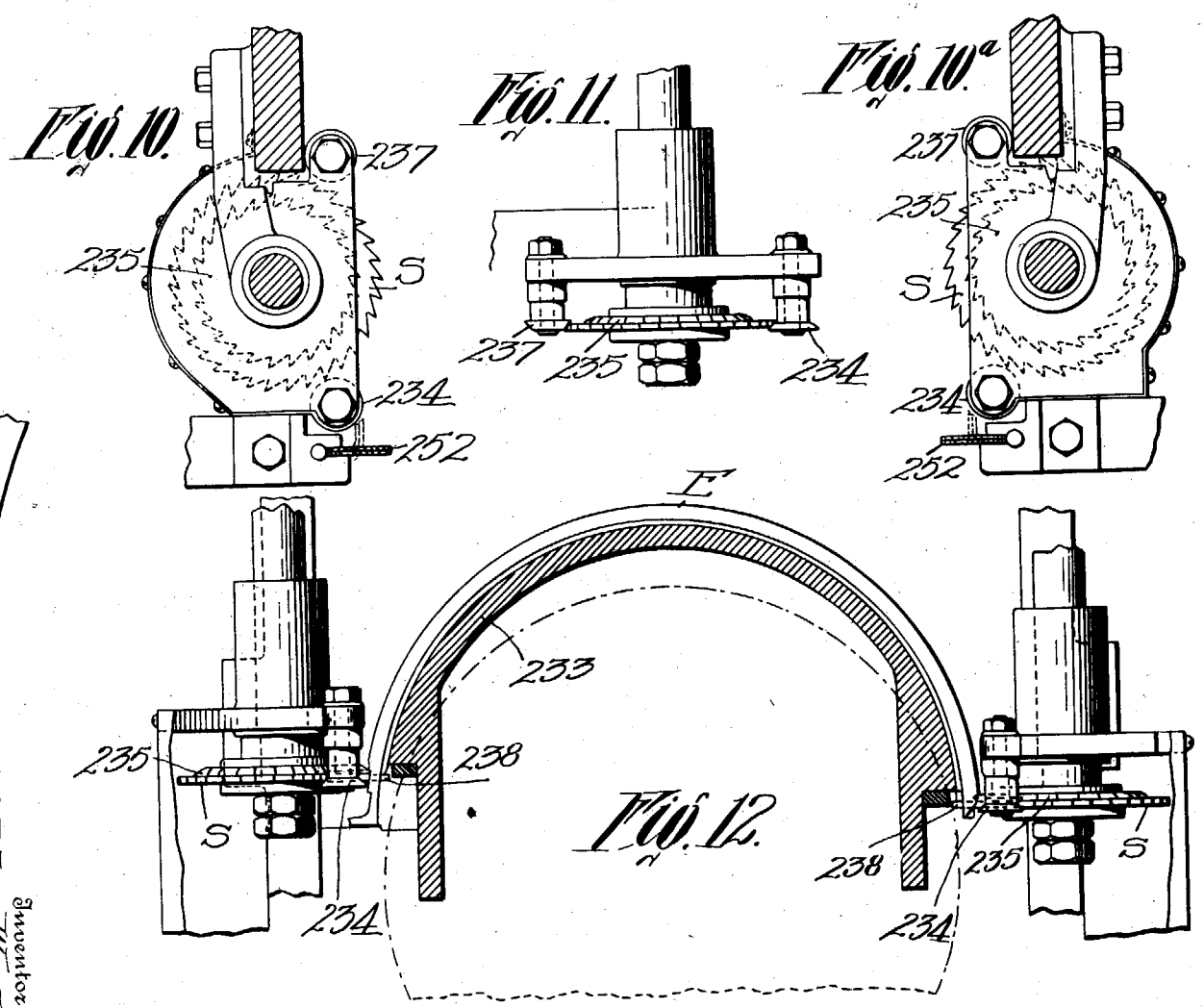
Witnesses
C. F. Nesson
C. S. Hartnett
Inventor
H. A. Wise Wood.
By Southgate & Southgate
Attorneys H. A. W. WOOD.
STEREOTYPE PRINTING PLATE FINISHING MECHANISM.
APPLICATION FILED AUG. 9, 1913.
Reissued Oct. 21, 1913.
13,633.
8 SHEETS—SHEET 5.
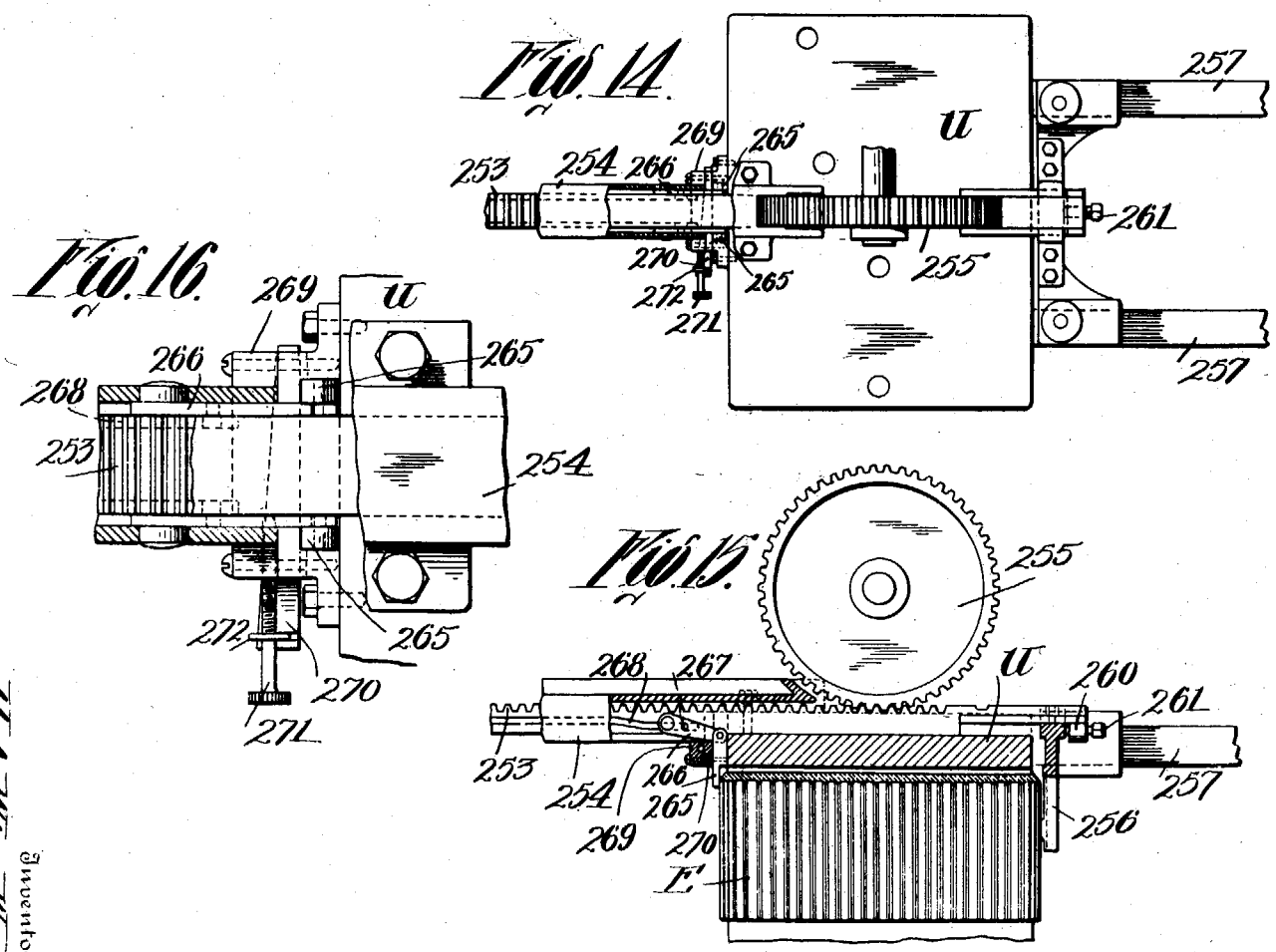
Witnesses
C. F. Nesson
C. S. Hartnett
Inventor
H. A. Wise Wood.
By Southgate & Southgate.
Attorneys

H. A. W. WOOD.

STEREOTYPE PRINTING PLATE FINISHING MECHANISM.

APPLICATION FILED AUG. 9, 1913.

Reissued Oct. 21, 1913.

13,633.

8 SHEETS—SHEET 6.

Witnesses

C. F. Mason

C. S. Hartnett

Inventor

H. A. Wise Wood

By Southgate & Southgate

Attorneys

H. A. W. WOOD.

STEREOTYPE PRINTING PLATE FINISHING MECHANISM.

APPLICATION FILED AUG. 9, 1913.

Reissued Oct. 21, 1913.

13,633.

8 SHEETS—SHEET 7.

Witnesses

C. F. Mason

C. S. Hartnett

Inventor

H. A. Wise Wood.

By Southgate & Southgate

Attorneys

H. A. W. WOOD.

STEREOTYPE PRINTING PLATE FINISHING MECHANISM.

APPLICATION FILED AUG. 9, 1913.

Reissued Oct. 21, 1913.

13,633.

8 SHEETS—SHEET 8.

Witnesses

C. F. Wesson

C. I. Hartnett

Inventor

H. A. Wise Wood.

By Southgate & Southgate.

Attorneys

UNITED STATES PATENT OFFICE.

HENRY A. WISE WOOD, OF NEW YORK, N. Y., ASSIGNOR, BY MESNE ASSIGNMENTS, TO THE AUTOPLATE COMPANY OF AMERICA, OF JERSEY CITY, NEW JERSEY, A CORPORATION OF NEW JERSEY.

STEREOTYPE-PRINTING-PLATE-FINISHING MECHANISM.

13,633. Specification of Reissued Letters Patent. Reissued Oct. 21, 1913.

Original application filed March 12, 1900, Serial No. 8,384. Divided and application filed March 14, 1903, Serial No. 147,793. Original No. 1,009,271, dated November 21, 1911. Application for reissue filed August 9, 1913. Serial No. 783,988.

*To all whom it may concern:*

Be it known that I, HENRY A. WISE WOOD, a citizen of the United States, residing at New York, in the county of New York and State of New York, have invented a new and useful Stereotype-Printing-Plate-Finishing Mechanism, of which the following is a specification.

This application for patent is a division of my original application for patent filed March 12, 1900, Serial No. 8,384.

In the patent granted to me February 17, 1903, No. 721,117, I have shown, described and claimed what I believe to be the first organized automatic machine for casting and finishing curved stereotype printing plates used in rotary printing presses. In my aforesaid application for patent I have shown, described and claimed certain improvements designed to bring the mechanism of said patent up to a high state of commercial efficiency.

This present application for patent is filed in pursuance of a Patent Office requirement, and covers the specific details of the improved finishing mechanism.

The accompanying eight sheets of drawings show enough of the complete machine to enable the improved details of the finishing mechanism to be understood.

Figure 17:
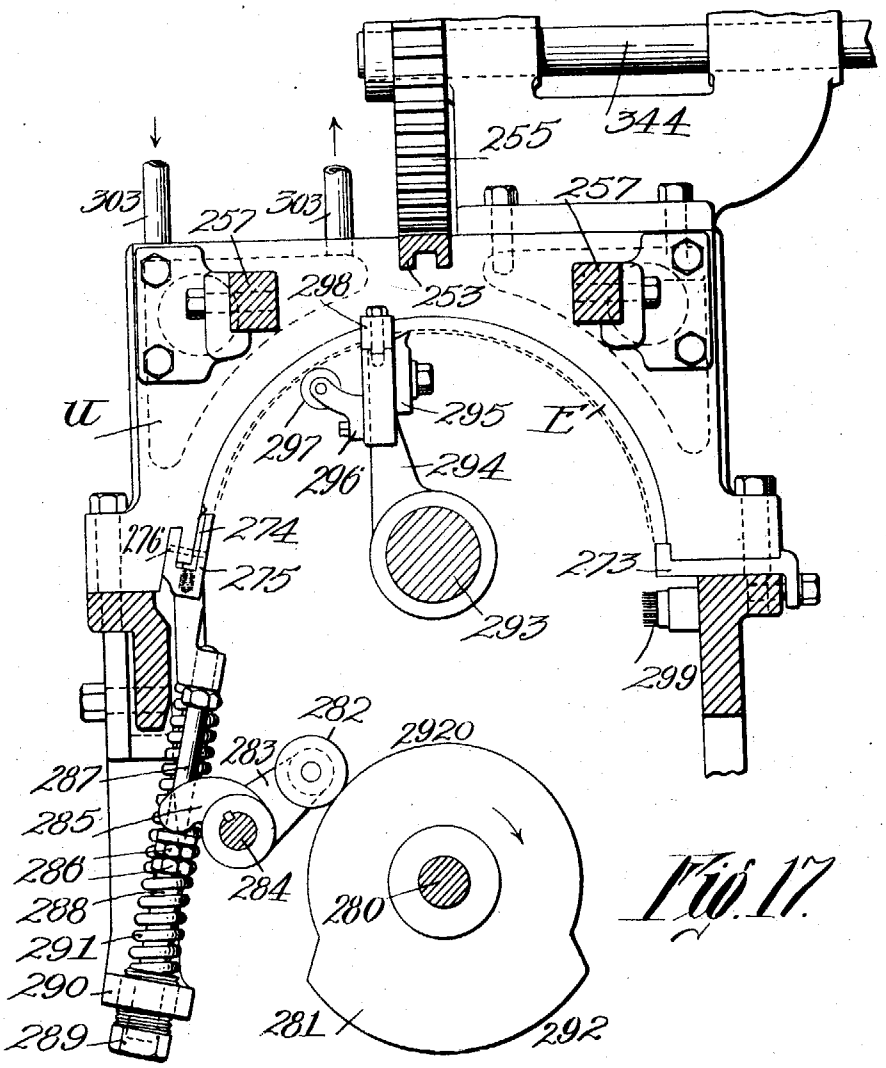
Figure 18:
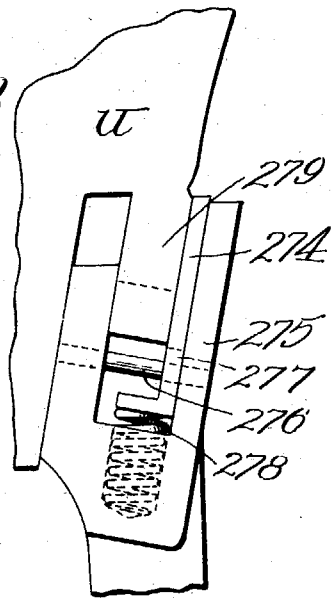
Figures 19, 20, 21:
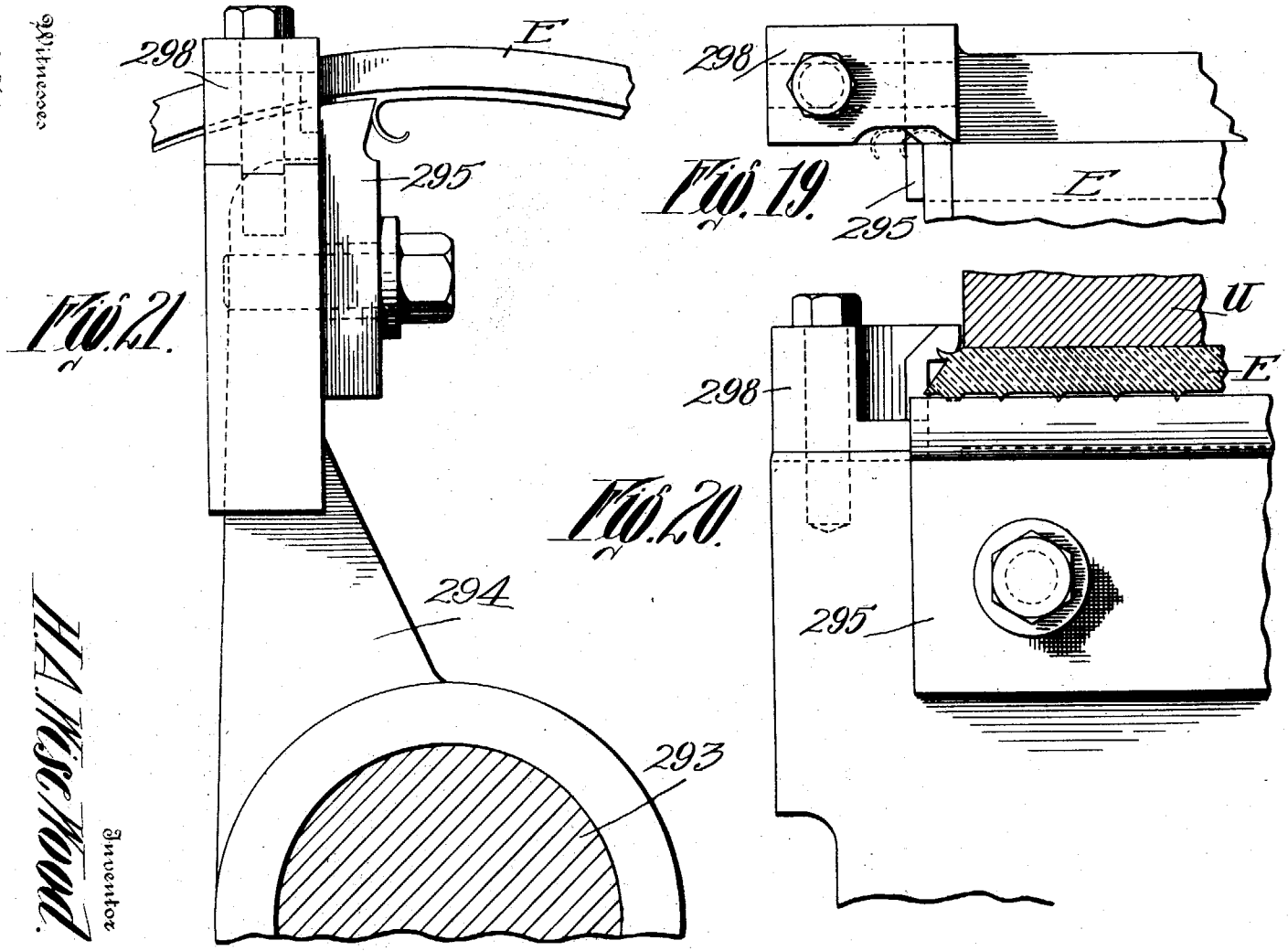
Figure 22:
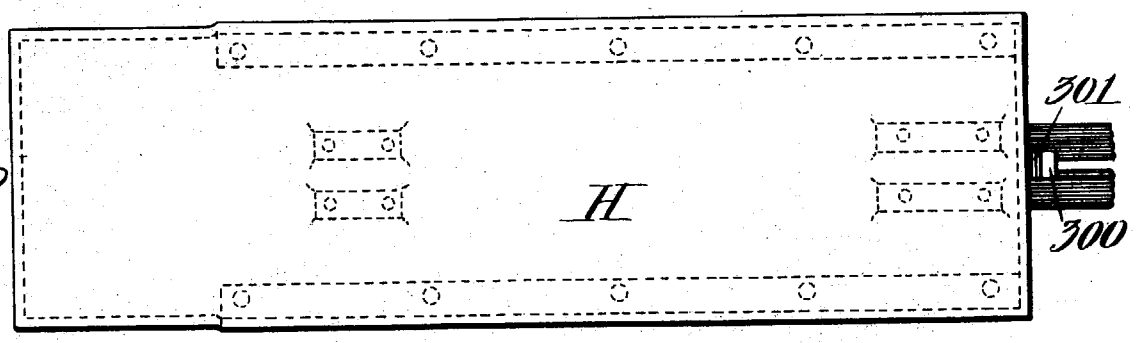
Figure 24:
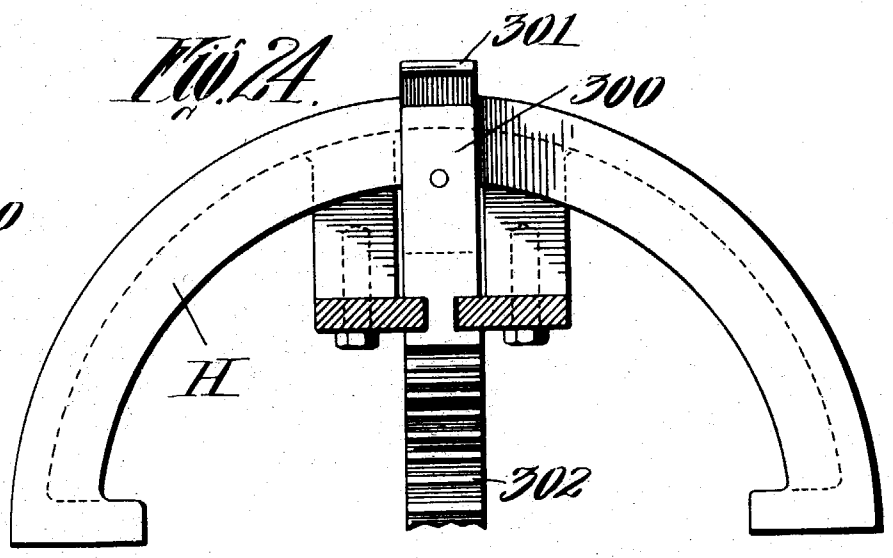
Figure 23:
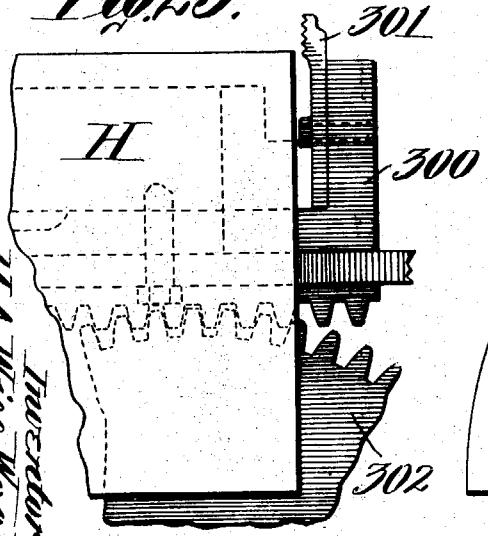

Referring to said drawings, and in detail, Figure 1 is a side elevation of the mechanism as a whole. Fig. 2 is a plan, and Fig. 3 an end view of the sliding rack-bar and head for moving the plate forward. Fig. 4 is a detail showing the engaging piece on said head. Fig. 5 is a detail showing the adjusting screw thereof. Fig. 6 is a section taken on the line 2 of Fig. 1 looking toward the finishing mechanism. Fig. 7 is a detail of the gearing. Fig. 8 is a detail view of the flexible means used to prevent the saw-dust flying back into the casting mechanism. Fig. 9 is a plan view of the belt used to drive the saws. Figs. 10 and 10[a] are plan views of the saws. Fig. 11 is a side view of one of the saws. Fig. 12 is a cross-sectional view illustrating the position and arrangement of the saws. Fig. 13 is a detail of the plate showing the way the same is finished or trimmed by the saws. Fig. 14 is a plan, and Fig. 15 is a sectional elevation illustrating the stop used to position the plate in the arch. Fig. 16 is a plan view partly in section on an enlarged scale illustrating the adjusting mechanism for the stop. Fig. 17 is a cross-sectional view illustrating the clamping mechanism for holding the plate in the arch. Fig. 18 is a detail of the spring clamping-jaw. Fig. 19 is a plan, Fig. 20 a front elevation, and Fig. 21 a side elevation of the finishing tools. Fig. 22 is a plan, Fig. 23 a partial side elevation, and Fig. 24 a rear elevation of the delivery stand and second conveyer.

The mechanism comprises a casting chamber formed by the annular space between a cylindrical core and a segmental back, in which the plates are cast from a flexible matrix. Each plate as soon as it has solidified is delivered from the casting chamber by a half revolution of the core. The plate is then detached from the core by a suitable lifter mechanism, which elevates the plate above the core. A first conveyer then takes the plate and moves the same axially over a guiding device past saws, which trim up the straight ends of the plate, into an arch. The plate is clamped in the arch, and its inside or concave surface and its curved ends are then finished off by suitable tools. A second conveyer then moves the finished plate axially out on a delivery stand.

The present application covers improvements in the mechanism which finishes the plate, so that the same can operate efficiently at a high speed.

Referring to the drawings, and in detail, C designates the core, and B the back of the casting apparatus.

Each plate after it has been removed from the casting chamber by a half revolution of the core is raised by a suitable lifter, so as to come in line with a guiding device 233 made in the form of a half cylinder, which is arranged substantially in line with the axis of the core C. The first conveyer now acts to slide the cast plate, which is designated by the letter E, along the guiding frame 233 past the two cutting off and truing saws S—S, which will cut off and trim the edges of the plate.

Small rollers 234 are arranged in front of each saw to keep the plate in position before it passes to the saws. Each saw is provided, in addition, with a V-edged cutter 235, which will cut a small groove 236 in the plate near each edge, so that the plate can be accurately guided by said grooves after it leaves the saws. Rollers 237 are arranged beyond the saws to engage these grooves, and guides 238 are arranged to project from the frame 233, so that the plate will be guided very accurately during and after the sawing operation. The saws are driven by a belt 239 from pulley 240. The belt is led around idler pulley 241, then around the pulleys 242 on the shafts which carry the saws, and then around an idler 243. The idler pulley 241 is journaled on a stud 244 projecting up from a rod 245 which is mounted to slide in a bearing 246. A spring 247 is arranged between said bearing, and is kept under tension by check-nuts 248 threaded on the end of said rod 245. By this means the belt 239 will be kept under tension. The shafts of the saws are provided with fly or balance wheels 249. By this arrangement the belt will be kept under a tight spring tension, and the momentum of the fly or balance wheels will keep the saws evenly in operation as they strike the plate.

The saws turn in opposition to the advancing movement of the plate. The saws are preferably boxed up or mounted in suitable casings 250, and suitable chutes 251, see Fig. 1, are provided so that the strips or shavings cut off by the saws will be carried out clear of the machine. Brushes or other flexible means 252 are arranged between the casting mechanism and the saws to bear firmly on the plate as the same passes by the saws, so as to prevent the saw-dust raised by the saws from passing back into the casting mechanism or clogging the various gearings of the machine. The conveyer for sliding the plate from over the core or cylinder past the saws and into the arch hereinafter described, consists of a sliding-rack-bar 253 fitted to slide in suitable guides 254. The rack-bar is given a reciprocating motion by a gear 255 which is actuated as hereinafter described. The said rack-bar engages a pushing-head 256 which is fitted to slide on bars 257, see Fig. 3. The pushing head is provided with notched engaging bars 258 for engaging the end of the plate, see Fig. 4. The rack-bar 253 is loosely fitted on said pushing-head 256, and is held in place thereon by gibs 259, see Figs. 2 and 3. The end of the rack-bar has a downwardly projecting ear 260, tapped into which is a screw 261 which is arranged in position to strike on the pushing-head. Projecting up from the rack-bar is a stop 262, engaging which are the free ends of bell-crank-levers 263 which are tied together by spring 264. This arrangement provides for a lost motion between the rack-bar and the pushing-head.

When the pushing-head is brought to its extreme point of travel at the end of the machine, the same will strike on the framing, and the continued motion of the sliding-rack-bar will simply actuate the bell-crank-levers and put them under tension. When the sliding-rack-bar reverses its motion, and has moved some distance in the other direction, the screw 261 will pick up the sliding-head which will then move with the rack-bar. By adjusting this screw 261, the position in which the pushing-head stops at the other extreme can be adjusted, so that the point at which the plate will be left by the pushing-head can be accurately determined. The bell-crank-levers and the springs before mentioned provide a mechanism so that the pushing-head can dwell in its position farthest away from the saws, so that the plate can turn up into position in front of the pushing-head. This dwell will be for some little period of time, as the sliding-rack is actuated by a crank-motion, as hereinafter described. As the plate is moved by the pushing-head past the saws S—S it passes into an arch U.

A stop 265 is arranged at the delivery end of the arch. This stop has ears pivoted on the end of levers 266, which have pins 267 engaging cam grooves 268 cut in the sliding-rack-bar 253. These parts are so arranged that the stop will move down as the plate enters the arch, so that the plate will be brought up against it by the conveyer and accurately positioned in the arch, so that it can be properly acted upon by the finishing mechanism hereinafter described. The cam grooves will lift the stop 265 out of the way as soon as the plate is positioned as hereinbefore described. A framing 269 is secured on the end of the arch. In this framing is arranged a wedge 270 which engages an inclined face on said framing 269. A screw 271 is tapped into said framing 269, and the same carries a collar 272 engaging a groove cut in said wedge. The wedge is arranged to bear on the back of the stop 265 which is pivoted on its levers 266. By adjusting the screw 271 the wedge can be adjusted back and forth, and hence the position of the stop can be very accurately adjusted. By this means the plate can be registered in the arch, that is, centered exactly so that the edge finishing tools hereinafter mentioned may work exactly up to the type face of the plate without destroying the edges thereof. As the plate passes into the arch, it is guided on one edge by guide 273 which engages the edge of the plate, and at its other edge by an extra spring-guiding jaw 274 which engages the groove 236 in the plate, and holds the plate so that the type face or edges thereof will not be marred or rubbed against the arch as the plate moves into the same. This extra jaw 274 is arranged in a clamping jaw 275, and is held in place between the same and the end of the arch by means of pins 276 which engage slots 277 in the extra jaw. Springs 278 are provided to keep the extra jaw normally in its raised position. The clamping jaw 275 is fitted to an ear or ledge 279 projecting down from the arch. The extra spring-jaw is arranged so that it will strike on the edge of the arch as the clamping-jaw 275 moves up, so that the plate will be lifted off of the extra clamping jaw 274 and clamped by the jaw 275. A shaft 280 is arranged below the arch. The same carries a cam 281, bearing on which is a roller 282 arranged upon an arm 283 secured on a shaft 284. The shaft 284 is provided with a finger 285 which engages check-nuts 286 threaded on a rod 287 secured to the clamping-jaw 275. The clamping-jaw is provided with two rods 288 which are fitted into hollow screws 289 threaded into ears 290 formed on the framing below the arch. Strong springs 291 are arranged on the rods 288 between the clamping jaw 275 and said screws 289. By this construction the clamping jaw 275 will be normally pushed up by the strong springs 291, the tension of which may be adjusted by the hollow screws 289.

When the high face 292 of the cam 281 strikes the roller 282, the clamping jaw will be forcibly moved down, but when the low face 2920 of the cam strikes said roller 282 the clamping jaw will be moved up to clamp the plate by said springs 291. Thus a spring relief is obtained in the clamping mechanism. The cam 281 is geared to operate so that the clamping jaw will be in its lowermost position as the plate passes into the arch, and so that when the plate is in the arch, the plate will be rigidly clamped so that the finishing tools can operate on the inside and edges of the plate.

293 designates a shaft which is journaled concentrically of the arch. Arranged on the same is a suitable arm 294 which carries a knife 295 for smoothing or trimming the ribs formed on the inner side of the plate. Secured on said arm 294 are brackets 296, in which is journaled a roller 297 which is arranged to bear on the inner side of the plate back of the knife 295 so as to smooth out and roll down any irregularities left by said knife. Edge finishing tools 298 for the plate are also arranged on said arm 294. These edge finishing tools are arranged to cut off the small bur left on the end of the plate between the end rims and the type, and also to just cut off the sharp edge or corner on the edge of the plate bevel. A brush or flexible means 299 is arranged to clean the knife 295, and the tools, as they rotate past the same, so that no chips or shavings will be left thereon to mar or deface the inner surface of the plate.

When the finishing operation is completed, a conveyer 300 moves into the arch This conveyer has a notched engaging piece 301. When this conveyer is wholly within the arch, and the piece 301 is beyond the end of the plate, the clamping jaw 275 releases the plate, allowing a drop of the plate, so that the forward motion of the conveyer pulls the finished plate out upon a delivery stand H. This second conveyer is actuated by a gear 302 which has an oscillating motion imparted to it as hereinafter described. Two independent conveyers are thus used; one to transfer the plate from over the casting mechanism past the saws into the arch, and the other to transfer the plate from the arch and deliver the same. By this arrangement as the first conveyer must move a long distance the same can have a powerful motion given to it, to push the plate positively past the saws, while the second conveyer need only have sufficient power to convey the plate from the arch to the delivery stand a short distance. By making the first conveyer work above the plate, and the second conveyer below the plate, these motions can be obtained. Also by this construction the inner surface of the arch does not have to be cut into, whereby the convex or delicate printing-face of the plate is subjected to a smooth surface.

The arch U is made hollow, as shown in Fig. 17, and suitable water pipes 303 are arranged to circulate water through the same. It is especially desirable to water-jacket the arch, as by doing this, the same will be prevented from heating and losing its shape, and the plate will be cooled as far as is possible. By keeping the arch in exact shape the plate will be very accurately finished and forced to precise cylindrical shape as it receives the final operation.

The gearing for actuating the various parts will now be described.

304 and 305 designate the usual tight and loose pulleys by which power is applied to the machine. A lever 306 carrying belt fingers 307 is arranged to shift the belt from one pulley to the other. The lever 306 has an extending arm 308 which engages a pivoted lever 309, which carries a brake-shoe 310 which bears on a fly wheel 311, so that when the belt is shifted on to the loose pulley, the brake-shoe will engage the fly wheel and quickly stop the machine. Suitable belt-tighteners 312 are arranged above the tight and loose pulleys.

The lever 306 connects by link 314 to a lever 313 arranged on a shaft 315 which extends along past the casting mechanism so that the operator standing near the casting mechanism can control the starting and stopping of the machine as is more particularly shown and described in my original application for patent.

The driving shaft 317 on which the pulleys are arranged carries a worm 318 which drives a worm-wheel 319 secured on a shaft 320. This shaft 320 has a pinion 321, which, by means of intermediate 322, drives a gear 323 secured on the cam-shaft 74, from which cam shaft various parts of the casting mechanism are driven, as more particularly shown and described in my original application for patent. Also arranged on the shaft 320 is a pinion 324 which engages a gear 325 mounted on a stud and carrying a pinion 326. This pinion 326 engages an intermediate 327, which latter meshes with and drives a gear 328 on the cam-shaft 280. The gear 328 drives a gear 329 on the shaft 293 which carries the finishing tools. The shaft 317 is carried across the machine, and carries a miter-gear 332 which engages another miter-gear 333 on a short shaft 334, which carries a miter-gear 335 at its end which meshes with and drives a miter-gear 336 on the vertical shaft 337 on which the pulley 240 which drives the saws is arranged.

The cam shaft 74 is provided with a bevel-gear 338 which meshes with a bevel-gear 339 on a short stud 340. A crank-arm 341 is arranged to turn with bevel-gear 339, and actuates a sliding-rack 342 which is fitted to slide in a frame 343 pivoted on shaft 344. The said sliding-rack 342 engages a pinion 345 fitted on said shaft 344. The gear 255 which engages the sliding rack bar 253 is arranged on the other end of the shaft 344. By this arrangement the first conveyer will be given a crank-actuated reciprocating motion. Another bevel-gear 346 is arranged on said cam-shaft 74, and engages a bevel-gear 347 arranged on a short shaft 348. A crank-arm 349 is arranged on the end of this shaft 348 and actuates a sliding rack 350 mounted to slide in a frame hung on shaft 352. The said sliding-rack frame engages a pinion 351 on said shaft 352, and the gear 302 which engages the second conveyer 300 is also arranged on this shaft. By this gearing, the second conveyer will have a crank-actuated reciprocating motion imparted thereto. This gearing is arranged so that the parts will operate synchronously to accomplish their respective functions, as previously described, the cam-shaft 74 making one revolution for each complete cycle of operation. As thus arranged, the mechanism has been brought to work in a commercial way at the speed before indicated.

The operation of the entire mechanism has been so fully detailed in describing the respective parts that the same can readily be followed.

Many other arrangements and details can be worked out for accomplishing the operations described without departing from the combinations expressed in the claims.

Having thus fully described the improvements, what I claim and desire to secure by Letters Patent is:—

1. The combination in a stereotype printing plate finishing mechanism, of saws for cutting off the edges of the plate, a conveyer for moving the plate past the saws, and cutting disks for cutting a guiding groove in the plate near each edge thereof.

2. The combination in a stereotype printing plate finishing mechanism, of saws for cutting off the edges of the plate, means for moving the plate past the saws, cutting disks for cutting a small guiding groove near each edge of the plate, and rollers or shoes for engaging these grooves to guide the plate.

3. The combination in a stereotype printing plate finishing mechanism, of saws, cutting disks turning therewith for cutting grooves in the plate, rollers for engaging underneath the edges of the plate before it passes to the saws, and rollers for engaging the grooves cut in the plate after it leaves the saws.

4. The combination in a stereotype casting and finishing mechanism, of a saw for the edge of the plate, means for moving the plate past the saw, and flexible means arranged between the casting mechanism and saw to bear on the plate to prevent the dust from passing back into the casting mechanism.

5. The combination in a stereotype casting and finishing mechanism, of saws for cutting off the edges of the plate, means for moving the plate past the saws, and flexible means bearing on the plate to prevent the dust passing back into the casting mechanism.

6. The combination in a stereotype printing plate finishing mechanism, of the arch, tools for finishing the plate when in the arch, means for moving the plate axially into the arch, and a stop for accurately determining the position of the plate in the arch.

7. The combination in a stereotype printing plate finishing mechanism, of the arch, a conveyer for moving the plate axially into the arch, an adjustable stop against which the plate is moved by the conveyer, and means for clamping and finishing the plate in the arch.

8. The combination in a stereotype printing plate finishing mechanism, of the arch, a conveyer for sliding the plate axially into the arch, means for clamping and finishing the plate in the arch, a movable stop against which the plate is brought, connections between the conveyer and stop for actuating the latter, and means for moving the plate out of the arch after it has been finished.

9. The combination in a stereotype printing plate finishing mechanism, of the arch, a clamping jaw for clamping the plate in the arch, a cam for actuating the jaw, and connections between the cam and clamping jaw including a spring arranged to cause the jaw to yieldingly engage the plate.

10. The combination in a stereotype printing plate finishing mechanism, of the arch, means for moving the plate into the arch, a clamping jaw for clamping the plate in the arch, and an extra spring guiding jaw for guiding the plate into the arch, so that the type face or edges thereof will not be marred or rubbed against the arch as the plate is moved into the same.

11. The combination in a stereotype printing plate finishing mechanism, of the arch, means for moving the plate into the arch, a clamping jaw for clamping the plate in the arch, and a spring guiding jaw arranged in the clamping jaw for accurately guiding the plate into the arch.

12. The combination in a stereotype printing plate finishing mechanism, of a water-jacketed arch, means for moving a plate into the arch, means for clamping the plate in the arch and finishing the same, and a conveyer arranged to move into the arch underneath the plate for delivering the plate from the arch.

13. The combination in a stereotype printing plate finishing mechanism, of the arch, means for moving the plate axially into the arch, a stop for determining the position of the plate in the arch, means for clamping the plate in the arch and finishing the same, means for delivering the plate from the arch, and means for operating the stop so that the same will be moved out of the way as the plate is delivered from the arch.

14. The combination in a stereotype printing plate finishing mechanism, of means for holding the plate, a knife for truing out the inside of the plate, and a roller for smoothing the plate after it has been trued.

15. In a plate finishing device, the combination of a feed device along which the plate travels, an end finishing cutter, a stop for the plate adapted to engage the surface to be finished by said cutter and arrest the plate, and means for moving the stop out of the path of said cutter.

16. In a plate finishing machine, the combination of a feed device, along which the plate travels, an end finishing cutter, a stop for the plate adapted to engage the surface to be finished by the cutter and arrest the plate, means for moving the stop out of the path of the cutter, and means for holding said plate in position while the stop is out of contact therewith.

17. A stereotype finishing apparatus comprising means for engaging a portion of a stereotype plate and positioning the plate within the finishing means, said finishing means also comprising a member which is capable of removing that portion of the plate which is engaged by the positioning means while the plate is positioned in said finishing means.

18. A stereotype finishing apparatus comprising means for engaging a portion of a stereotype plate and positioning the plate within the finishing means, said finishing means also comprising a member which is capable of removing the portion of the plate by which the said plate was positioned during the finishing operations.

19. An apparatus for finishing stereotype printing plates comprising an arch, means for confining hot plates therein, means for trimming the edges thereof while hot, and means for simultaneously applying a cooling fluid to the arch.

20. In combination, a supporting frame, a shell mounted thereon, plate finishing mechanism, means for operatively moving said shell and plate finishing means relatively to each other, and means for supplying cooling fluid to said shell.

21. An apparatus for finishing hot semicylindrical stereotype printing plates comprising an arch or shell, means for confining the plate therein so that its type face will be in contact therewith, means for circulating water through the arch to cool the same, and means for finishing and shaping the plate while confined in the arch whereby its type face will be chilled during the finishing and shaping operation.

22. An apparatus for finishing hot semicylindrical stereotype printing plates comprising an arch or shell, means for confining the plate therein so that its type face will be in contact therewith, means for circulating water through the arch to cool the same, and means for shaving the inside of the plate and pressing the same into exact shape while confined in the arch whereby its type face will be chilled during the finishing and shaping operation.

In witness whereof I have hereunto set my hand in the presence of two subscribing witnesses.

HENRY A. WISE WOOD.

Witnesses:
LILLIAN C. JONES,
LLEWELLYN LLOYD.